United States Patent [19]

Momose et al.

[11] 4,251,859

[45] Feb. 17, 1981

[54] DATA PROCESSING SYSTEM WITH AN ENHANCED PIPELINE CONTROL

[75] Inventors: Tsugio Momose; Akira Fujita; Kanji Kubo, all of Hadano, Japan

[73] Assignee: Hitachi, Ltd., Japan

[21] Appl. No.: 957,688

[22] Filed: Nov. 6, 1978

[30] Foreign Application Priority Data

Nov. 7, 1977 [JP] Japan ............... 52-132514

[51] Int. Cl.³ ............................................. G06F 9/38
[52] U.S. Cl. ........................................................ 364/200
[58] Field of Search ... 364/200 MS File, 900 MS File

[56] References Cited

U.S. PATENT DOCUMENTS

| | | | |
|---|---|---|---|
| 3,346,851 | 10/1967 | Thorton et al. | 364/200 |
| 3,717,850 | 2/1973 | Ghiron et al. | 364/200 |
| 3,875,391 | 4/1975 | Shapiro et al. | 364/200 |
| 4,014,006 | 3/1977 | Sorensen et al. | 364/200 |
| 4,075,688 | 2/1978 | Lynch et al. | 364/200 |
| 4,110,830 | 8/1978 | Krygowski | 364/200 |

*Primary Examiner*—Mark E. Nusbaum
*Attorney, Agent, or Firm*—Craig & Antonelli

[57] ABSTRACT

A data processing system, for executing each instruction, by carrying out a plurality of successive partial processing operations, begins to process the first partial processing operation of an instruction succeeding a defeat overlap instruction before execution of the defeat overlap instruction is finished in response to the detection that a predetermined number of machine cycles is further required for the complete execution of the defeat overlap instruction.

8 Claims, 3 Drawing Figures

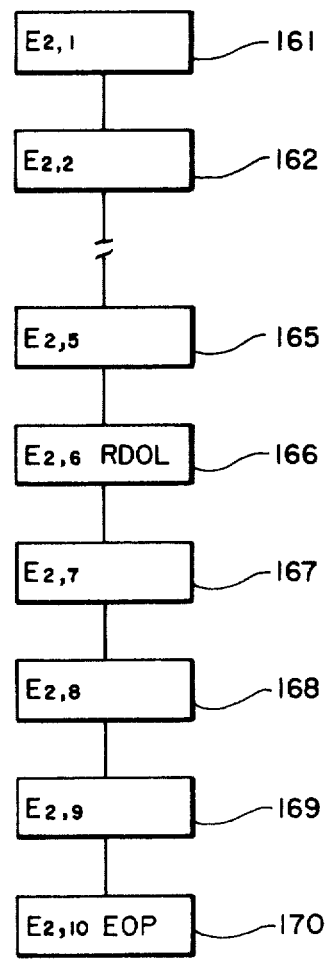

DATA PROCESSING SYSTEM WITH AN ENHANCED PIPELINE CONTROL

BACKGROUND OF THE INVENTION

The present invention relates to a data processing system which comprises a plurality of units, each of which is under pipeline control. The present invention specifically relates to a data processing system which utilizes microinstructions for controlling an arithmetic unit therein.

A conventional large scale data processing system typically processes an instruction by way of a plurality of partial processing operations. The system may comprise, for example, first to $m^{th}$ partial processing units where the number of partial processing operations is equal to m. Each partial processing operation is processed in a corresponding partial processing unit. The first partial processing operation is carried out in the first partial processing unit, and the second to $m^{th}$ partial processing operations are respectively carried out in second to $m^{th}$ partial processing units sequentially. Each partial processing unit is controlled in such a manner that it effects a corresponding partial processing operation of succeeding instructions in parallel and in overlapping relationship with every other partial processing unit and that each processing unit carries a corresponding partial processing operation in response to a synchronizing signal. These operations may include a decode processing operation (D operation) for decoding an instruction to be processed, and address modification processing operation (A operation) for calculating an operand address necessary for the execution of the instructions, a load processing operation (L operation) for reading out operands corresponding to the calculated operand addresses from memory, a transfer processing operation (T operation) for transferring the read out operands to an execution unit, and an execution processing operation (E operation) for executing an arithmetic or logical operation with the transferred operands. Each partial processing operation usually requires one machine cycle. If these five processing operations are processed sequentially for different instructions, the total execution time for successive instructions is equal to five machine cycles.

If these five partial processing operations are processed in parallel and in overlapping relationship for different instructions under pipeline control, the total execution time for successive instructions can be reduced to one machine cycle.

The above discussion of execution time is applicable only when each partial processing operation requires only one machine cycle; therefore, the total execution time of each instruction requires a minimum execution of five machine cycles. it is to be noted, however, that there are many instructions which require more than one machine cycle for one partial processing operation. One example of such instructions is an instruction for a decimal arithmetic operation. For such instructions, the execution time for successive instructions is reduced a considerable extent because a complete parallel processing operation cannot be maintained among different partial processing units, as will be explained below.

An instruction unit controls the partial processing units for respective partial processing operations D, A, L, T, and E, so that the units process corresponding partial processing operations in a pipeline mode. The E partial processing operation is carried out in an execution unit.

The instruction unit decodes successive instructions, calculates the operand addresses, reads out the operands designated by the calculated operand addresses, and transfers the read out operands to operand buffer registers to be stored therein.

An instruction for a decimal arithmetic operation requires more than one machine cycle for the execution of a partial processing operation because during execution in the execution unit an operand read out is required. The operands read out from memory in response to a request for an operand read out during execution of the instruction for a decimal arithmetic operation are also stored in the operand buffer registers.

The operand buffer registers are provided for use in common by the instruction unit and the execution unit in many data processing systems in order to reduce required hardware. The operands read out and stored in the operand buffer registers, in response to a request provided by the instruction unit, may be destroyed by the operands read out in response to a request provided by the execution unit, if the instruction being processed in the execution unit requires an operand or operands to be read out and partial processing operations for succeeding instructions are begun in parallel and in overlapping relationship.

In order to avoid operand destruction, a conventional data processing system prohibits process-instructions succeeding an instruction which requires that operands be read out in an E partial processing operation from being decoded, until the E partial processing operation for the instruction has been completed. An instruction which requires that an operand or operands be read out in an E operation is one of the so-called defeat overlap instructions. A defeat overlap instruction is an instruction which will invalidate partial operations of succeeding instructions, if the partial operations are processed in parallel and in overlapping relationship with the defeat overlap instruction. The defeat overlap instructions belong to the prior art and can be found in, for example, "IBM Maintenance Library: System/370 Model 168 Theory of Operations/Diagrams Manual (Volume 2) I unit, SY 22-6932-2" published by International Business Machines Corporation.

According to the prior art, when a defeat overlap instruction is decoded, succeeding instructions are prohibited from being decoded until the execution of the defeat overlap instruction is completed and the state in which the execution of succeeding instructions is prohibited is called a defeat overlap state. If the processing of succeeding instructions is begun in the instruction unit after the execution of the defeat overlap instruction has been completed, the succeeding instructions begin to be processed in the execution unit after an elapse of several machine cycles. Therefore, during these several machine cycles, the execution unit is idle (it does not execute any processing operation); during this time the processing of succeeding instructions cannot be completed. This results in an increase in the average execution time for successive instructions.

SUMMARY OF THE INVENTION

An object of the present invention is to provide a data processing system with reduced execution time.

Another object of the present invention is to provide a data processing system wherein successive instructions are executed in an execution unit successively without any idle time.

A further object of the invention is to provide a data processing system wherein an execution unit is controlled by micro-instructions without being idle.

For attaining these objects, the data processing system according to the present invention comprises means to terminate the defeat overlap state before the processing of a defeat overlap instruction has been completed, thereby eliminating the idle time of a partial processing unit.

BRIEF DESCRIPTION OF THE DRAWINGS

The present invention can be better understood by referring to the drawings.

FIG. 2 shows an example of a micro-instruction sequence used in the execution unit of FIG. 1; and FIG. 3 is an example of a time chart showing various stages of partial processing operations according to the present invention.

DETAILED DESCRIPTION

Figure 1:
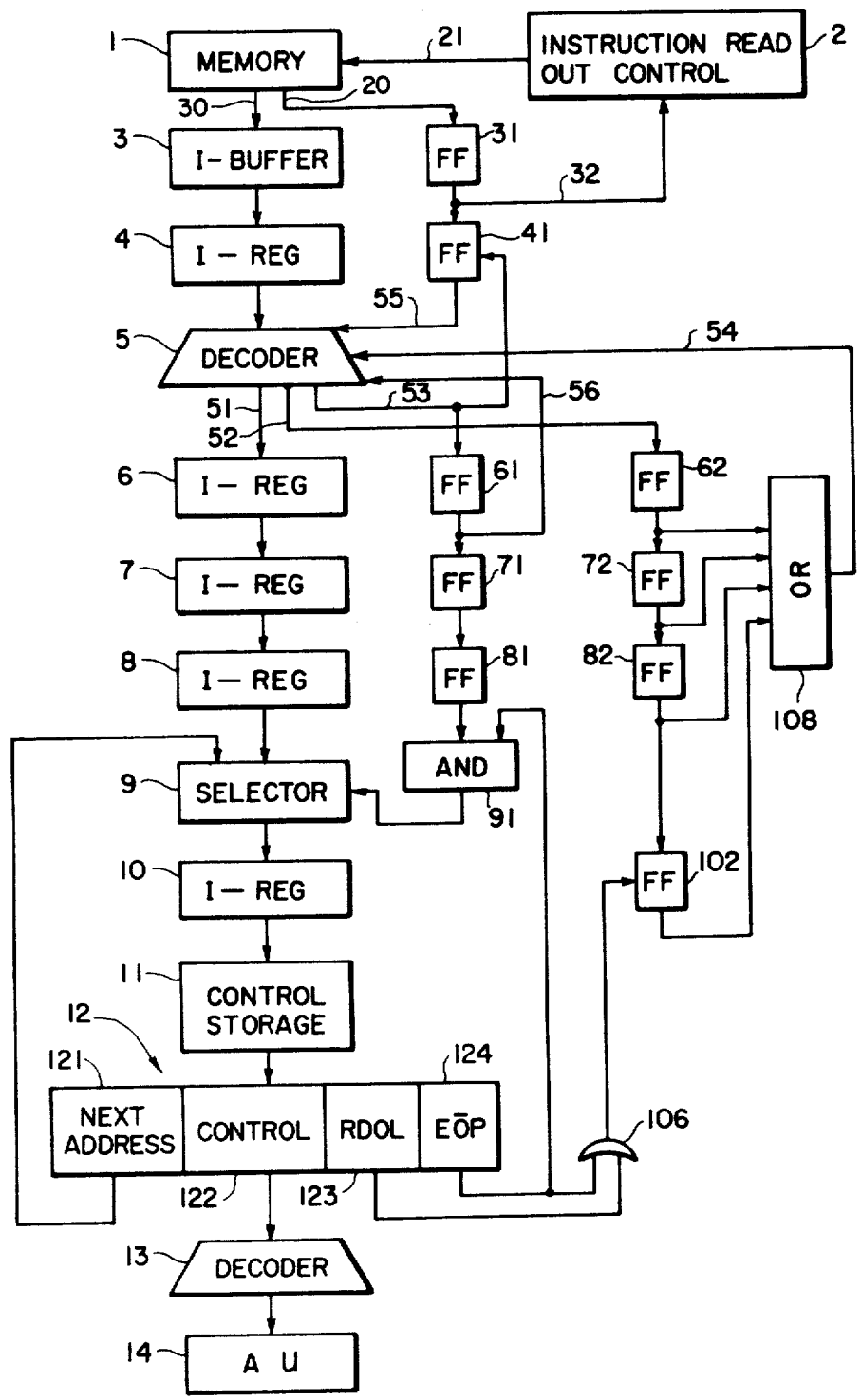
FIG. 1 is a schematic block circuit diagram of relevent portions of an instruction unit and an execution unit according to the present invention.

Referring to FIG. 1, a memory 1 stores a plurality of instructions and operands. Some of the instructions are read out from the memory 1 into an instruction buffer 3 to be stored therein by way of line 30 in response to a request signal on a line 21. The request signal on the line 21 is provided by an instruction read out control circuit 2 when flip-flop (FF) 31 is reset and its output on a line 32 is "0".

When the memory 1 has transferred a plurality of instructions to the instruction buffer 3, the memory 1 provides a high level signal on line 20 to set FF31, which indicates that the contents of instruction buffer 3 are valid. For each machine cycle, one of the instructions within instruction buffer 3 is transferred to an instruction register 4 to be stored therein in response to FF31 being set and FF41 being reset. When an instruction has been stored in the instruction register 4, FF41 is set by a "1" signal provided by FF31 indicating that the contents of instruction register 4 are valid. FF31 is reset when all the instructions stored in the instruction buffer 3 have been transferred to the instruction register 4.

Every machine cycle, decoder 5 decodes the instruction stored in the instruction register 4 under the condition that the signals on lines 54, 55, and 56 are respectively "0", "1", and "0". These signals are provided by an OR gate 108, FF41, and FF61, respectively. The decoder 5 determines whether or not the operation code of the instruction in the instruction register satisfies predetermined conditions for controlling execution of the instruction, and provides on a line 51 the instruction to which the result of the determination is added. The instruction on the line 51 is stored in an instruction register 6. The decoder further determines whether or not the instruction in the instruction register 4 is a defeat overlap instruction, and provides a high level signal on line 52 to set FF62. After completing these determinations, decoder 5 outputs a high level signal on line 53 to reset FF41. Thus, the decode processing operation of an instruction is completed during every machine cycle.

Every machine cycle, the instruction stored in the instruction register 6 is used to calculate operand addresses in an address calculating unit (not shown), and is transferred to an instruction register 7 to be stored therein. These processing operations are carried out under the condition that FFs 61 and 71 are set and reset, respectively. When an instruction is stored in the register 7, FF71 is set by a "1" signal provided by FF61, and FF72 is set if a "1" signal is provided by FF62; then FFs 61 and 62 are reset. Thus, the address modification processing operations of an instruction is completed during every machine cycle.

Every machine cycle, the instruction stored in the instruction register 7 is transferred to an instruction register 8, under the condition that FFs 71 and 81 are set and reset, respectively. When the transfer occurs, FF81 is set by a "1" signal provided by FF71, and FF82 is set if a "1" signal is provided by FF72; then FFs 71 and 72 are reset. During these processing operations, the operand addresses calculated as described above are loaded by a load unit (not shown) to the memory 1 to read out corresponding operands. Thus, the load processing operation of an instruction is completed during every machine cycle.

Every machine cycle, the instruction stored in the instruction register 8 is transferred to instruction register 10 by way of a selector 9 under the condition that a signal provided from AND gate 91 to the selector is a "1". This condition is satisfied when FF81 is set and an end-of-operation-bit field 124 of a micro-instruction stored in a control register 12 is a "1". Only the final micro-instructions of micro-instruction sequences have a "1" in their end-of-operation-bit fields.

After the instruction is transferred from the instruction register 8 to the instruction register 10, FF102 is set if a "1" signal is provided by FF82; then FFs 81 and 82 are reset. During these processing operations, operands read out from the memory as described above are transferred by a transfer unit (not shown) to operand buffer register (not shown) to be stored therein. Thus, the transfer processing operation of an instruction is completed during every machine cycle.

When the condition mentioned above is not satisfied, that is, when the micro-instruction in the control register 12 is not the final micro-instruction of a micro-instruction sequence or when FF81 is reset and there is no instruction in the instruction register 8, the next address field 121 of the control register 12 is transferred to the instruction register 10 by way of the selector 9, for every machine cycle.

The instruction register 10 provides the address of a micro-instruction to be read out from a control storage 11. The read out micro-instruction is stored in the control register 12. A control field 122 within the control register 12 is decoded by a decoder 13, in order to control an arithmetic unit 14.

The micro-instructions in the control storage differ from those in the prior art in that they contain release-defeat-overlap-bit fields. Correspondingly, the control register 12 differs from that in the prior art in that it contains a release-defeat-overlap-bit field 123. Only the micro-instructions of the micro-instruction sequences for executing defeat overlap instructions which precede the final micro-instructions of those sequences by a number equal to the minimum number of processing cycles minus one, have a "1" in their release-defeat-overlap-bit fields.

The release-defeat-overlap field 123 in the control register 12 is transferred by way of an OR gate 106 to FF102 to reset it, which differs from the prior art. FF102 is also reset by a "1" signal provided by the end-of-operation-bit field 124 of the control register 12 by way of the OR gate 106, as in the prior art.

The operation of the embodiment of FIG. 1 will be better understood by referring to FIGS. 2 and 3. FIG. 2 is a time chart showing an example of various partial processing operations for four instructions. The first, third, and fourth instructions are assumed not to be defeat overlap instructions, while the second instruction is assumed to be a defeat overlap instruction.

The first to fourth instructions are all assumed to require one machine processing cycle for a decode operation ($D_1$, $D_2$, $D_3$, or $D_4$), an address modification operation ($A_1$, $A_2$, $A_3$, or $A_4$), a load operation ($L_1$, $L_2$, $L_3$, or $L_4$), and a transfer operation ($T_1$, $T_2$, $T_3$, or $T_4$). For execution operations ($E_1$, $E_3$, $E_4$), the first, third, and fourth instructions are assumed to require one machine cycle, while the second instruction is assumed to require ten machine cycles for suboperations $E_{2,1}$ to $E_{2,10}$. Let it be assumed, for simplicity of description, that prior to machine cycle 0, the first instruction is stored in register 4, the remaining three instructions are stored in the instruction buffer 3, and FFs 31 and 41 are set. The remaining FFs in FIG. 1 are assumed to be reset.

During machine cycle 0, a decode operation ($D_1$) of the first instruction is carried out, and $A_1$, $L_1$, $T_1$, and $E_1$ operations are carried out during succeeding machine cycles 1 to 4. The decode operation ($D_2$) is carried out during machine cycle 1 for the second instruction which is read out from the instruction buffer 3 into the instruction register 4 during operation $D_1$, described above, because the first instruction is not a defeat overlap instruction, FF62 is reset and the signal on line 54 is low. Because the second instruction is a defeat overlap instruction, the decoder 5 outputs a high level signal on the line 52, to thereby set FF62.

At the beginning of machine cycle 2, the signal on the line 54 is high because FF62 is set. Therefore, the third instruction, which is transferred from the instruction buffer 3 to the instruction register 4 during machine cycle 1, is not decoded by the decoder 5. During machine cycle 2, wherein the $A_2$ operation is carried out, the second instruction is transferred from the instruction register 6 to the instruction register 7, and then FFs 71 and 72 are set and FFs 61 and 62 are reset.

At the beginning of machine cycle 3, the signal on line 54 is still high because FF72 is set. Therefore, the third instruction in instruction register 4 is not decoded by the decoder 5. During machine cycle, 3, wherein the $L_2$ operation is carried out, the second instruction is transferred from the instruction register 7 to the instruction register 8, FFs 81 and 82 are set, and then FFs 71 and 72 are reset.

At the beginning of machine cycle 4, the signal on line 54 is still high because FF82 is set. Therefore, the third instruction in the instruction register 4 is not decoded by decoder 5. During machine cycle 4, wherein the $T_2$ operation is carried out, the $E_1$ operation for the first instruction is carried out and the micro-instruction in the control register 12 has a "1" in its end-of-operation-bit field. As explained above, FF81 is set. Therefore, AND gate 91 provides a high level signal to the selector 9. The "1" bit in the end-of-operation-bit field 124 resets FF102 which has been set during the $T_1$ operation for machine cycle 3. Under the condition that FF102 is reset, the second instruction selected by the selector 9 is stored in the instruction register 10, FF102 is set in response to a "1" signal from FF82, and then FFs 81 and 82 are reset.

At the beginning of machine cycle 5, the signal on the line 54 is still high, because FF102 is set. Therefore, the third instruction in the instruction register 4 is not decoded by the decoder 5. During machine cycle 5, the second instruction stored in the instruction register 10 reads out the initial micro-instruction of the micro-instruction sequences for the E operation of the second instruction.

Referring to FIG. 3, the micro-instruction sequence for the second instruction comprises ten micro-instructions 161 to 170, respectively corresponding to the suboperations $E_{2,1}$ to $E_{2,10}$. The initial micro-instruction 161 is read out in response to the second instruction in the instruction register 10. This micro-instruction is used for suboperation $E_{2,1}$. The next address field 121 of the initial micro-instruction in the control register 12 is transferred to the instruction register 10 by way of the selector 9. The signal provided by the AND gate is low because the end-of-operation-bit field of the initial micro-instruction is "0". Similarly, the micro-instructions 162 to 166 are respectively read out into the control register 12 during the machine cycles 6 to 10, and respectively used for suboperations $E_{2,2}$ to $E_{2,6}$. It is to be noted that micro-instruction 166 precedes the final micro-instruction 170 of the sequence by four micro-instructions, the number four being equal to the minimum execution machine cycles minus one. The release-defeat-overlap-bit field of the micro-instruction 166 contains a "1" bit which resets FF102 during machine cycle 10. The micro-instructions 167 to 170 are successively read out into the control register 12 and used for suboperations $E_{2,7}$ to $E_{2,10}$. The end-of-operation-bit field of the final micro-instruction 170 contains a "1" bit. Thus, the execution stage of the second instruction is completed at the end of the machine cycle 14.

Meanwhile, at the beginning of the machine cycle 11, the signal on the line 54 is low because FF102, which has been set, is reset by the release-defeat-overlap-bit field during the machine cycle 10.

Therefore, the decode operation ($D_2$) of the third instruction begins, which operation is followed by the $A_3$, $L_3$, $T_3$, and $E_3$ operations and is further followed by the $D_4$, $A_4$, $L_4$, $T_4$, and $E_4$ operations of the fourth instruction. The execution unit processes the suboperations $E_{2,10}$ of the second instruction during machine cycle 14 and the $E_3$ operation of the third instruction during the succeeding machine cycle 15. Therefore, there is no idle time for the execution unit.

Thus, processing of an instruction which follows a defeat-overlap instruction is begun before the defeat-overlap instruction is finished which results in a reduction of the average execution time of the instructions.

It is to be noted that the embodiment in FIG. 1 can be applied to a prior art micro-instruction which has no release-defeat-overlap-bit field therein because FF102 can be reset by the end-of-operation-bit field of such micro-instructions. In such a case, the idle time of the execution unit is unavoidable. The instruction transfers from the instruction buffer 3 to the instruction register 4, and the instruction registers are controlled by a status control circuit, which is not shown in FIG. 1, and the detailed explanation of which is not given because it is the same as in the prior art.

The present invention is not limited to the embodiment described above but includes modifications made by those skilled in the art within the framework of the claims described below.

What is claimed:

1. A data processing system for executing instructions comprising:

storage means for storing instructions and operands;

processing means, connected to said storage means, for executing each instruction by carrying out a plurality of successive partial processing operations and for processing the respective operations of each instruction with relative overlap between different operations of succeeding instructions;

decode means, connected to said storage means, for detecting whether an operation code of an instruction to be executed is for a defeat overlap instruction;

control means, connected to said processing means, for prohibiting all partial processings of a succeeding instruction from being executed by said processing means, in response to the detection of a defeat overlap instruction by said decode means; and detection means, connected to said processing means, for detecting that a predetermined number of machine cycles is further required for the complete execution of said defeat overlap instruction by detecting that said processing of said defeat overlap instruction has reached a predetermined stage;

said control means further including means for cancelling the prohibition of execution of said succeeding instruction in response to the detection by said detection means.

2. A data processing system according to claim 1, wherein said defeat overlap instruction is an instruction which requires the reading out of at least an operand for the last partial processing operation.

3. A data processing system according to claim 2, wherein said predetermined number is equal to one less than the number of partial processing operations.

4. A data processing system according to claim 2, wherein said processing means comprises:

control storage means for storing a plurality of micro-instruction sequences for executing the last partial processing operations for respective instructions, the micro-instruction sequences thereof, which correspond to said defeat overlap instruction, having a release defeat overlap bit in those micro-instructions that precede the final micro-instructions of said respective sequences by said predetermined number of micro-instructions; and control register means, connected to said control storage means, for storing a micro-instruction read out from said control storage means;

said detection means being responsive to said release-defeat-overlap-bit in said control register means.

5. A data processing system according to claim 4, further comprising flip-flop means, which is set in response to the detection of a defeat overlap instruction by said decode means, and which is reset in response to the detection by said detection means, said control means being responsive to said flip-flop means.

6. A data processing system according to claim 5, wherein:

each final micro-instruction of each micro-instruction sequence includes an end-of-operation bit; and said flip-flop means is reset by said end-of-operation bit when said each final micro-instruction is read out into said control register means.

7. A data processing system according to claim 4, wherein said processing means comprises:

a plurality of instruction registers for respectively storing instructions for respective partial processing operations;

a plurality of flip-flops, each of which is respectively provided in correspondence with one of said instruction registers, for storing an indication that an instruction stored in said corresponding one of instruction registers is a defeat overlap instruction;

means for transferring an instruction read out from said storage means every machine cycle from a respective one of said instruction registers to a further one of said instruction registers which corresponds to a succeeding partial processing operation; and means for setting sequentially a respective one of said plurality of flip-flops every machine cycle after said defeat overlap instruction is detected by said decode means;

wherein said control means is responsive to any one of the outputs of said flip-flops.

8. A data processing system according to claim 7, wherein said control means includes means responsive to one of said plurality of flip-flops being reset by said release-defeat-overlap-bit in said control register means for overriding the prohibition of the partial processings of the succeeding instruction.

* * * * *